(12) United States Patent
Wang et al.

(10) Patent No.: US 9,155,050 B2
(45) Date of Patent: *Oct. 6, 2015

(54) METHOD AND APPARATUS FOR DETERMINING TRANSMIT POWER

(71) Applicant: Huawei Technologies Co., Ltd., Shenzhen, Guangdong (CN)

(72) Inventors: Weixin Wang, Shanghai (CN); Xueli Ma, Shanghai (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

This patent is subject to a terminal disclaimer.

(21) Appl. No.: 14/025,504

(22) Filed: Sep. 12, 2013

(65) Prior Publication Data

US 2014/0010198 A1 Jan. 9, 2014

Related U.S. Application Data

(63) Continuation of application No. 13/563,226, filed on Jul. 31, 2012, now Pat. No. 8,559,376, which is a continuation of application No. 13/090,874, filed on Apr. 20, 2011, now Pat. No. 8,233,439, which is a continuation of application No. PCT/CN2009/074784, filed on Nov. 4, 2009.

(30) Foreign Application Priority Data

Nov. 4, 2008 (CN) .......................... 2008 1 0172290

(51) Int. Cl.
*H04W 52/06* (2009.01)
*H04W 52/16* (2009.01)
(Continued)

(52) U.S. Cl.
CPC .............. *H04W 52/06* (2013.01); *H04W 52/16* (2013.01); *H04W 52/44* (2013.01); *H04W 52/146* (2013.01); *H04W 52/286* (2013.01)

(58) Field of Classification Search
None
See application file for complete search history.

(56) References Cited

U.S. PATENT DOCUMENTS 6,744,742 B1 6/2004 Koskela et al.
7,586,977 B2 9/2009 Usuda et al.
(Continued)

FOREIGN PATENT DOCUMENTS

CN 1430821 A 7/2003
CN 1527522 A 9/2004
(Continued)

OTHER PUBLICATIONS

International Search Report in corresponding PCT Patent Application No. PCT/CN2009/074784 (Feb. 11, 2010).
(Continued)

*Primary Examiner* — Hoon J Chung
(74) *Attorney, Agent, or Firm* — Leydig, Voit & Mayer, Ltd.

(57) ABSTRACT

An apparatus is disclosed for determining a gain factor of an E-DPDCH in a compressed mode. In disclosure, the E-DPDCH gain factor in the compressed mode is determined according to the number of E-DPDCHs used for initial transmission of data. With the determined E-DPDCH gain factor, the transmission power of the E-DPDCH can be accordingly determined. As the E-DPDCH gain factor in compressed mode is determined according to the number of the E-DPDCHs for initial transmission of data, the gain factor of the E-DPDCH in compressed mode can be determined accurately, and thus the transmit power of the E-DPDCH can be determined accurately according to the E-DPDCH gain factor in the compressed mode. Therefore, the waste of transmit power of the E-DPDCH is reduced, and thus the system capacity is improved.

3 Claims, 2 Drawing Sheets

(51) Int. Cl.
*H04W 52/44* (2009.01)
*H04W 52/28* (2009.01)
*H04W 52/14* (2009.01)

(56) References Cited

U.S. PATENT DOCUMENTS

| | | | |
|---|---|---|---|
| 7,606,212 | B2 | 10/2009 | Kwak et al. |
| 7,729,717 | B2 | 6/2010 | Xu |
| 2003/0142979 | A1 | 7/2003 | Raaf et al. |
| 2006/0092887 | A1 | 5/2006 | Iacono et al. |
| 2006/0176867 | A1 | 8/2006 | Kwak et al. |
| 2007/0155335 | A1 | 7/2007 | Love et al. |
| 2008/0051127 | A1 | 2/2008 | Xu |
| 2008/0069035 | A1 | 3/2008 | Pinheiro et al. |
| 2009/0227256 | A1 | 9/2009 | Goto et al. |
| 2009/0290559 | A1 | 11/2009 | Pelletier et al. |
| 2010/0087202 | A1 | 4/2010 | Ventola et al. |
| 2011/0038305 | A1 | 2/2011 | Mella et al. |
| 2011/0188517 | A1 | 8/2011 | Wang et al. |
| 2011/0207419 | A1 | 8/2011 | Wang et al. |
| 2012/0282973 | A1 | 11/2012 | Usuda et al. |
| 2014/0010198 | A1 | 1/2014 | Wang et al. |

FOREIGN PATENT DOCUMENTS

| | | |
|---|---|---|
| CN | 1716837 A | 1/2006 |
| CN | 1770655 A | 5/2006 |
| CN | 1855752 A | 11/2006 |
| CN | 1874179 A | 12/2006 |
| CN | 1960197 A | 5/2007 |
| CN | 101132199 A | 2/2008 |
| CN | 101741431 A | 6/2010 |
| CN | 102547951 A | 7/2012 |
| EP | 1892846 B1 | 11/2008 |
| RU | 2216862 C2 | 11/2003 |
| RU | 2328079 C2 | 6/2008 |
| WO | WO 2005064821 A1 | 7/2005 |
| WO | WO 2008034370 A1 | 3/2008 |

OTHER PUBLICATIONS

Written Opinion of the International Searching Authority in corresponding PCT Patent Application No. PCT/CN2009/074784 (Feb. 11, 2010).
Related U.S. Appl. No. 13/250,073 (Aug. 13, 2012).
Related U.S. Appl. No. 13/090,874 (Mar. 29, 2012).
$1^{st}$ Office Action in corresponding Chinese Patent Application No. 200810172290.2 (Dec. 1, 2011).
Chinese Search Report in corresponding Chinese Patent Application No. 200810172290.2 (Oct. 20, 2011).
$1^{st}$ Office Action in corresponding Russian Patent Application No. 2011122603/07 (033491) (Jul. 3, 2012).
$1^{st}$ Office Action in corresponding Australian Patent Application No. 2009311136 (Feb. 21, 2013).
$1^{st}$ Office Action in corresponding European Patent Application No. 09824408.0 (Feb. 11, 2013).
Notice of Allowance in corresponding Russian Patent Application No. 2011122603/07(033491) (Feb. 4, 2013).
Corresponding U.S. Appl. No. 13/100,516 (May 28, 2013).
"3GPP TS-RAN WG1 #39—$3^{rd}$ Generation Partnership Project; Technical Specification Group Services and System Aspects; R1-041412-E-DPDCH & E-DPCCH Gain Factor," Nov. 2004, $3^{rd}$ Generation Partnership Project, Valbonne, France.
Extended European Search Report in corresponding European Patent Application No. 09824408.0 (May 25, 2012).
"3GPP TS 25.214—$3^{rd}$ Generation Partnership Project; Specification Group Radio Access Network; Physical Layer Procedures (FDD); (Release 8)," XP050366888, Sep. 2008, pp. 1-89, V8.3.0, 3GPP, Valbonne, France.
"R1-083992; 25.214 CR 0514—Correction to E-DPCH Gain Factor Interpolation in Compressed Mode," 3GPP Draft, 3GPP TSG-RAN WG1 Meeting #54bis, Sep. 29, 2008, 3GPP, Valbonne, France.
"R1-084176; 25.214 CR 0517—Correction to E-DPCH Gain Factor Interpolation in Compressed Mode," 3GPP Draft, 3GPP TSG-RAN WG1 Meeting #55, Nov. 10, 2008, 3GPP, Valbonne, France.
$1^{st}$ Office Action in related U.S. Appl. No. 13/100,516 (Mar. 30, 2012).
"3GPP TS 25.213—3rd Generation Partnership Project; Technical Specification Group Radio Access Network; Spreading and modulation (FDD) (Release 6)," Mar. 2005, Version 6.2.0, 3rd Generation Partnership Project, Valbonne, France.
"3GPP 25.214—$3^{rd}$ Generation Partnership Project; Technical Specification Group Radio Access Network; Physical layer procedures (FDD) (Release 7)," May 2008, Version 7.9.0, $3^{rd}$ Generation Partnership Project, Valbonne, France.
"R1-050060—Gain factor setting for E-DCH," TSG-RAN WG1 Meeting #40, Feb. 14-18, 2005, Phoenix, Arizona.
"R1-084688—Correction to E-DPDCH gain factor interpolation in compressed mode," 3GPP TSG RAN WG1 Meeting #55, Nov. 10-Nov. 14, 2008, 3rd Generation Partnership Project, Prague, Czech Republic.
"R1-084689—Correction to E-DPDCH gain factor interpolation in compressed mode," 3GPP TSG RAN WG1 Meeting #55, Nov. 10-Nov. 14, 2008, 3rd Generation Partnership Project, Prague, Czech Republic.
"3GPP TS 25.214—$3^{rd}$ Generation Partnership Project; Technical Specification Group Radio Access Network; Physical layer procedures (FDD) (Release 6)," Jun. 2005, Version 6.6.0, 3rd Generation Partnership Project, Valbonne, France.
"R1-041412—E-DPDCH & E-DPCCH Gain Factor," 3GPP TSG RAN WG1 #39, Nov. 15-19, 2004, $3^{rd}$ Generation Partnership Project, Yokohama, Japan.
International Search Report from the Chinese Patent Office in International Application No. PCT/CN2009/074784 (Feb. 11, 2010).
Final Office Action in corresponding U.S. Appl. No. 13/250,073 (Feb. 14, 2012).

METHOD AND APPARATUS FOR DETERMINING TRANSMIT POWER

CROSS-REFERENCE TO RELATED APPLICATIONS

This application is a continuation of U.S. patent application Ser. No. 13/563,226, filed on Jul. 31, 2012, which is a continuation of U.S. patent application Ser. No. 13/090,874, filed on Apr. 20, 2011, which is a continuation of International Patent Application No. PCT/CN2009/074784, filed on Nov. 4, 2009, which claims priority to Chinese Patent Application No. 200810172290.2, filed on Nov. 4, 2008, all of which are hereby incorporated by reference in their entireties.

This application is related to U.S. patent application Ser. No. 13/100,516, filed May 4, 2011, and U.S. patent application Ser. No. 13/250,073, filed on Sep. 30, 2011, both of which are also incorporated herein by reference in their entireties.

FIELD OF THE INVENTION

The present invention relates to communications technologies, and in particular, to a method and an apparatus for determining transmit power.

BACKGROUND OF THE INVENTION

In a Wideband Code Division Multiple Access (WCDMA) system, the transmit power required by an Enhanced Dedicated Channel Dedicated Physical Data Channel (E-DPDCH) can be obtained according to an E-DPDCH gain factor. The E-DPDCH gain factor may be calculated by an extrapolation formula using one reference E-DCH Transport Format Combination (E-TFC). The extrapolation formula is as follows:

$$\beta_{ed,i,harq} = \beta_{ed,ref} \sqrt{\frac{L_{e,ref}}{L_{e,i}}} \sqrt{\frac{K_{e,i}}{K_{e,ref}}} \cdot 10^{\left(\frac{\Delta_{harq}}{20}\right)} \quad (1)$$

In the formula above, $\beta_{ed,ref}$ denotes the E-DPDCH gain factor of the reference E-TFC; $L_{e,ref}$ denotes the number of E-DPDCH used for the reference E-TFC; $L_{e,i}$ denotes the number of E-DPDCH used for the i:th E-TFC (that is, the i:th E-TFC is corresponding to the E-DPDCH whose E-DPDCH gain factor is currently to be obtained); if a spreading factor of E-DPDCH is 2, $L_{e,i}$ and $L_{e,ref}$ denote the number of channels assuming a spreading factor of E-DPDCH is 4; $K_{e,ref}$ denotes the transport block size of the reference E-TFC; $K_{e,i}$ denotes the transport block size of the i:th E-TFC; and Δharq denotes an offset of a Hybrid Automatic Repeat Request (HARQ), and is specified by the upper layer. Table 1 lists the values of Δharq.

TABLE 1

| Δharq Signal Value | Δharq Power Offset (dB) |
|---|---|
| 6 | 6 |
| 5 | 5 |
| 4 | 4 |
| 3 | 3 |
| 2 | 2 |
| 1 | 1 |
| 0 | 0 |

After the uplink 16 Quadrature Amplitude Modulation (16QAM) mode is introduced into the WCDMA system, the uplink service rate increases to 11.52 Mbps. With the increase of the service rate, a formula is put forward for calculating the E-DPDCH gain factor under high rate services. This formula uses two reference E-TFCs, and is called an interpolation formula. The interpolation formula is as follows:

$$\beta_{ed,i,harq} = \sqrt{\frac{L_{e,ref,1}}{L_{e,i}}} \cdot \sqrt{\left(\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right) \cdot 10^{\left(\frac{\Delta_{harq}}{20}\right)}}$$

In the formula above, $\beta_{ed,i,harq}$ denotes the E-DPDCH gain factor; $L_{e,i}$ denotes the number of E-DPDCH in non-compressed mode; $\beta_{ed,ref,1}$ and $\beta_{ed,ref,2}$ denote the E-DPDCH gain factors of the first and second reference E-TFCs respectively; $L_{e,ref,1}$ and $L_{e,ref,2}$ denote the number of E-DPDCHs used for the first and second reference E-TFCs; if the spreading factor of E-DPDCH is 2, $L_{e,ref,1}$ and $L_{e,ref,2}$ denote the number of channels assuming the spreading factor of E-DPDCH is 4; $K_{e,ref,1}$ and $K_{e,ref,2}$ denote the transport block sizes of the first and second reference E-TFCs; $K_{e,i}$ denotes the transport block size of the i:th E-TFC; and $\Delta_{harq}$ denotes the offset of the HARQ, and is specified by the upper layer.

In the prior art, if the Transmission Time Interval (TTI) is 10 ms in the compressed mode, the calculation of the E-DPDCH gain factor comes in two scenarios: the current frame is a compressed frame, and the current frame is a normal frame.

At least the following problems are found in the prior art: in the prior art The E-DPDCH gain factor calculated out in compressed mode does not reflect the transmit power required by the E-DPDCH accurately, and the transmit power required by the E-DPDCH which is determined according to the E-DPDCH gain factor is not accurate either. Consequently, part of the transmit power of E-DPDCH is wasted and therefore the system capacity is reduced.

SUMMARY OF THE INVENTION

The embodiments of the present invention provide a method and an apparatus for determining transmit power so as to determine the transmit power of E-DPDCH accurately and improve the system capacity.

To fulfill the foregoing objectives, a method for determining a transmit power is provided in an embodiment of the present invention. The method includes:
determining the E-DPDCH gain factor in compressed mode according to the number of E-DPDCH required for initial transmission of data; and
determining transmit power of E-DPDCH according to the E-DPDCH gain factor in compressed mode.

Further, an apparatus for determining a transmit power is provided in an embodiment of the present invention. The apparatus includes:
a gain factor determining module, configured to determine an E-DPDCH gain factor in compressed mode according to the number of E-DPDCH required for initial transmission of data; and
a power determining module, configured to determine transmit power of E-DPDCH according to the E-DPDCH gain factor determined by the gain determining module.

Further still, a base station is provided in an embodiment of the present invention, and the base station includes the foregoing apparatus for determining a transmit power.

Further still, a terminal is provided in an embodiment of the present invention, and the terminal includes the foregoing apparatus for determining a transmit power.

Compared with the prior art, the present invention brings at least the following benefits: The E-DPDCH gain factor in compressed mode is determined according to the number of E-DPDCH required for initial transmission of data, and therefore, the E-DPDCH gain factor in compressed mode is determined accurately, the transmit power of E-DPDCH is determined accurately according to the E-DPDCH gain factor, the waste of transmit power of E-DPDCH is reduced, and therefore the system capacity is improved.

BRIEF DESCRIPTION OF THE DRAWINGS

To describe the technical solution under the present invention more clearly, the following describes the accompanying drawings involved in the embodiments of the present invention. Apparently, the accompanying drawings outlined below are not exhaustive and shall not constitute any limitation to the scope of the present invention.

DETAILED DESCRIPTION OF THE EMBODIMENTS

The following detailed description is provided with reference to the accompanying drawings to provide a thorough understanding of the present invention. Evidently, the drawings and the detailed description are merely representative of particular embodiments of the present invention, and the embodiments are illustrative in nature rather than exhaustive, and shall not constitute any limitation to the scope of the present invention. All other embodiments, which can be derived by those skilled in the art from the embodiments given herein without any creative efforts, fall within the scope of the present invention.

A method for determining a transmit power is provided in an embodiment of the present invention. The E-DPDCH gain factor in compressed mode is determined according to the number of E-DPDCH required for initial transmission of data, and the transmit power of E-DPDCH is determined according to the E-DPDCH gain factor. This method determines the E-DPDCH gain factor in compressed mode accurately. Because the transmit power of E-DPDCH is determined according to the E-DPDCH gain factor, the waste of transmit power of E-DPDCH is reduced, and therefore the system capacity is improved.

Figure 1:
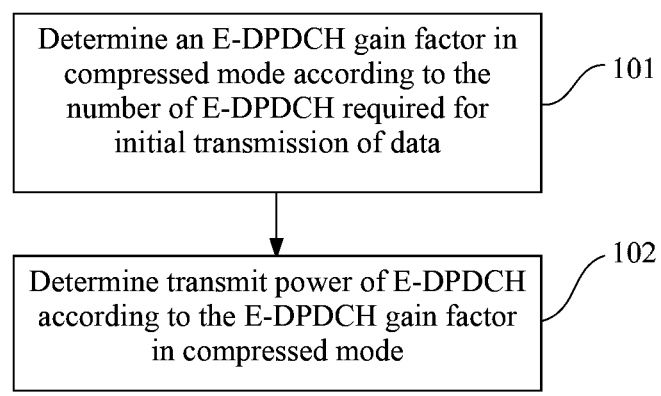
FIG. 1 is a flowchart of a method for determining transmit power in an embodiment of the present invention.

FIG. 1 is a flowchart of a method for determining a transmit power in an embodiment of the present invention. The method includes the following steps:

Step 101: Determine the E-DPDCH gain factor in compressed mode according to the number of E-DPDCH required for initial transmission of data.

In this embodiment, when a TTI is 10 ms, the E-DPDCH gain factor in compressed mode is calculated according to the number of E-DPDCH required for initial transmission of data, and interpolation formulas (2) and (3) are put forward.

Assuming $L_{e,I,i}$ denotes the number of E-DPDCH required for initial transmission of data, $\beta_{ed,C,i}$ denotes the E-DPDCH gain factor, and the current frame is a compressed frame, $$\beta_{ed,C,i} = \beta_{c,C,j} \cdot \sqrt{\frac{L_{e,ref,1}}{L_{e,I,i}}} \cdot$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta_{harq}}{20}\right)} \cdot \sqrt{\frac{15 \cdot N_{pilot,C}}{N_{slots,I} \cdot N_{pilot,N}}}$$

Assuming $L_{e,I,i}$ denotes the number of E-DPDCH required for initial transmission of data, $\beta_{ed,R,i}$ denotes the E-DPDCH gain factor, and the current frame is a non-compressed frame, $$\beta_{ed,R,i} = \sqrt{\frac{L_{e,ref,1}}{L_{e,I,i}}} \cdot \qquad (3)$$

$$\sqrt{\left(\left(\frac{\frac{L_{e,ref,2}}{L_{e,ref,1}} \beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)} \sqrt{\frac{15}{N_{slots,I}}} \cdot$$

$$10^{\left(\frac{\Delta_{harq}}{20}\right)}$$

In formula (2) and formula (3), $\beta_{e,C,j}$ denotes a Dedicated Physical Control Channel (DPCCH) gain factor used for a j:th Transport Format Combination (TFC) in compressed mode;

$$A_{ed,ref,1} = \frac{\beta_{ed,ref,1}}{\beta_c}, A_{ed,ref,2} = \frac{\beta_{ed,ref,2}}{\beta_c},$$

and $\beta_c$ is a DPCCH gain factor in non-compressed mode; $\beta_{ed,ref,1}$ and $\beta_{ed,ref,2}$ denote the E-DPDCH gain factors of the first and second reference E-TFCs respectively; $L_{e,ref,1}$ and $L_{e,ref,2}$ denote the number of E-DPDCHs used for the first and second reference E-TFCs respectively; if the spreading factor of E-DPDCH and $L_{e,ref,1}$ and $L_{e,ref,2}$ denote the number of channels assuming the spreading factor of E-DPDCH is 4; $K_{e,ref,1}$ and $K_{e,ref,2}$ denote the transport block sizes of the first and second reference E-TFCs respectively; $K_{e,i}$ denotes the transport block size of the i:th E-TFC; $\Delta_{harq}$ denotes the offset of the HARQ, and is specified by the upper layer; $N_{pilot,C}$ is the number of pilot bits per slot on the DPCCH in compressed frame; $N_{pilot,N}$ is the number of pilot bits per slot on the DPCCH in non-compressed frame; $N_{slots,I}$ is the number of non Discontinuous Transmission (DTX) slots in a frame used for initial transmission of data.

Step 102: Determine transmit power of E-DPDCH according to the E-DPDCH gain factor in compressed mode.

One of the methods for determining the transmit power of the E-DPDCH is: obtain a power offset according to the ratio of the E-DPDCH gain factor to the DPCCH gain factor, and then obtain the transmit power of E-DPDCH according to the power offset and absolute power of the DPCCH.

In the method for determining the transmit power in the foregoing embodiment, the E-DPDCH gain factor in compressed mode is determined according to the number of E-DPDCH required for initial transmission of data, and therefore, the E-DPDCH gain factor in compressed mode is determined accurately, the transmit power of E-DPDCH is determined according to the E-DPDCH gain factor, the waste of transmit power of E-DPDCH is reduced, and therefore the system capacity is improved.

Figure 2:
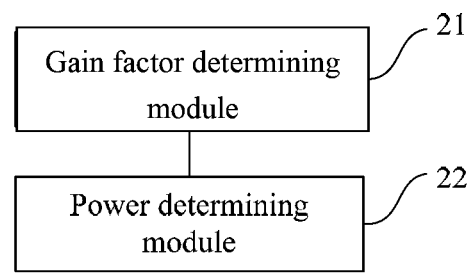
FIG. 2 shows a structure of an apparatus for determining transmit power in an embodiment of the present invention.

As shown in FIG. 2, an apparatus for determining transmit power in an embodiment of the present invention includes:

a gain factor determining module 21, configured to determine the E-DPDCH gain factor in compressed mode according to the number of E-DPDCH required for initial transmission of data; and a power determining module 22, configured to determine the transmit power of E-DPDCH according to the E-DPDCH gain factor determined by the E-DPDCH gain factor determining module 21.

Figure 3:
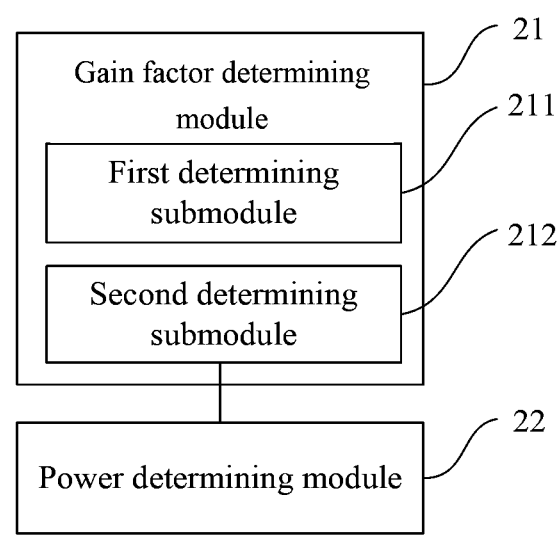
FIG. 3 shows a structure of another apparatus for determining transmit power in an embodiment of the present invention.

As shown in FIG. 3, the gain factor determining module 21 may include a first determining submodule 211 and a second determining submodule 212.

The first determining submodule 211 is configured to determine the E-DPDCH gain factor when $L_{e,I,i}$ denotes the number of E-DPDCH required for initial transmission of data, $\beta_{ed,C,i}$ denotes the E-DPDCH gain factor, and the current frame is a compressed frame:

$$\beta_{ed,C,i} = \beta_{c,C,j} \cdot \sqrt{\frac{L_{e,ref,1}}{L_{e,I,i}}} \cdot$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta_{harq}}{20}\right)} \cdot \sqrt{\frac{15 \cdot N_{pilot,C}}{N_{slots,I} \cdot N_{pilot,N}}}$$

The second determining submodule 212 is configured to determine the E-DPDCH gain factor when $L_{e,I,i}$ denotes the number of E-DPDCH required for initial transmission of data, $\beta_{ed,R,i}$ denotes the E-DPDCH gain factor, and the current frame is a non-compressed frame:

$$\beta_{ed,R,i} = \sqrt{\frac{L_{e,ref,1}}{L_{e,I,i}}} \cdot$$

$$\sqrt{\left(\left(\frac{\frac{L_{e,ref,2}}{L_{e,ref,1}} \beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2\right)} \cdot \sqrt{\frac{15}{N_{slots,I}}} \cdot 10^{\left(\frac{\Delta_{harq}}{20}\right)}$$

In the formula above, $\beta_{c,C,j}$ denotes the DPCCH gain factor used for the j:th TFC in compressed mode;

$$A_{ed,ref,1} = \frac{\beta_{ed,ref,1}}{\beta_c}, A_{ed,ref,2} = \frac{\beta_{ed,ref,2}}{\beta_c},$$

and $\beta_c$ is the DPCCH gain factor in non-compressed mode; $\beta_{ed,ref,1}$ and $\beta_{ed,ref,2}$ denote the E-DPDCH gain factors of the first and second reference E-TFCs; $L_{e,ref,1}$ and $L_{e,ref,2}$ denote the number of E-DPDCHs used for the first and second reference E-TFCs; $K_{e,ref,1}$ and $K_{e,ref,2}$ denote the transport block sizes of the first and second reference E-TFCs; $K_{e,i}$ denotes the transport block size of the i:th E-TFC; $\Delta_{harq}$ denotes the offset of the HARQ; $N_{pilot,C}$ is the number of pilot bits per slot on of the DPCCH in compressed frame; $N_{pilot,N}$ is the number of pilot bits per slot of the DPCCH in non-compressed frame; and $N_{slots,I}$ is the number of non DTX slots in a frame used for initial transmission of data.

In the apparatus for determining the transmit power in the foregoing embodiment, the gain factor determining module 21 determines the E-DPDCH gain factor in compressed mode according to the number of E-DPDCH required for initial transmission of data. Therefore, the E-DPDCH gain factor in compressed mode is determined accurately, the power determining module 22 determines the transmit power of E-DPDCH according to the E-DPDCH gain factor, the waste of transmit power of E-DPDCH is reduced, and therefore the system capacity is improved.

Further, a base station is provided in an embodiment of the present invention, and the base station includes the foregoing apparatus for determining transmission power. The base station may include all or part of the modules of the foregoing apparatus for determining the transmit power.

Further, a terminal is provided in an embodiment of the present invention, and the terminal includes the foregoing apparatus for determining a transmit power. The terminal may include all or part of the modules of the foregoing apparatus for determining a transmit power.

After reading the foregoing embodiments, those skilled in the art are clearly aware that the present invention may be implemented through hardware, or through software in addition to a necessary universal hardware platform. Based on such understanding, the technical solution under the present invention may be embodied in a software product. The software product may be stored in a nonvolatile storage medium (such as a Compact Disk-Read Only Memory (CD-ROM), a Universal Serial Bus (USB) disk, or a mobile hard disk), and may include several instructions that enable a computer device (such as a personal computer, a server, or a network device) to perform the method according to any embodiment of the present invention.

It is understandable to those skilled in the art that the accompanying drawings are only schematic diagrams of the exemplary embodiments, and the modules or processes in the accompanying drawings are not mandatory for implementing the present invention.

It is understandable to those skilled in the art that the modules in an apparatus provided in an embodiment of the present invention may be distributed in the apparatus described herein, or may be located in one or more apparatuses different from the apparatus described herein. The modules may be combined into one module, or split into multiple submodules.

The sequence number of the embodiment above is designed to facilitate description only, and does not represent the order of preference.

Detailed above are several exemplary embodiments of the present invention, and the scope of the present invention is not limited thereto. Any modifications or variations that can be derived by those skilled in the art shall fall within the scope of the present invention.

What is claimed is:

1. An apparatus comprising:
a non-transitory storage medium including executable instructions and a processor,
wherein the executable instructions, when executed by the processor, cause the processor to:
determine an Enhanced Dedicated Channel Dedicated Physical Data Channel (E-DPDCH) gain factor in a compressed mode
as follows, when a current frame is compressed:

$$\beta_{ed,C,i} = \beta_{c,C,j} \cdot \sqrt{\frac{L_{e,ref,1}}{L_{e,I,i}}} \cdot$$

$$\sqrt{\left(\left(\frac{\frac{L_{e,ref,2}}{L_{e,ref,1}} A_{ed,ref,2}^2 - A_{ed,ref,1}^2}{K_{e,ref,2} - K_{e,ref,1}}\right)(K_{e,i} - K_{e,ref,1}) + A_{ed,ref,1}^2\right)} \cdot$$

$$10^{\left(\frac{\Delta_{harq}}{20}\right)} \cdot \sqrt{\frac{15 \cdot N_{pilot,C}}{N_{slots,I} \cdot N_{pilot,N}}}$$

wherein,
$\beta_{ed,C,i}$ denotes the E-DPDCH gain factor in the compressed mode,
$L_{e,I,i}$ denotes the number of E-DPDCHs for initial transmission of data,
$\beta_{c,C,j}$ denotes a Dedicated Physical Control Channel (DPCCH) gain factor used for the j:th Transport Format Combination (TFC) in the compressed mode, $$A_{ed,ref,1} = \frac{\beta_{ed,ref,1}}{\beta_c}, \text{ and } A_{ed,ref,2} = \frac{\beta_{ed,ref,2}}{\beta_c},$$

where $\beta_c$ is a DPCCH gain factor in a non-compressed mode,
$\beta_{ed,ref,1}$ and $\beta_{ed,ref,2}$ denote the E-DPDCH gain factors of a first and a second reference E-TFCs, respectively,
$L_{e,ref,1}$ and $L_{e,ref,2}$ denote the number of E-DPDCHs used for the first and second reference E-DCH TFCs (E-TFCs), respectively,
$K_{e,ref,1}$ and $K_{e,ref,2}$ denote transport block sizes of the first and second reference E-TFCs, respectively,
$K_{e,i}$ denotes the transport block size of the i:th E-TFC,
$\Delta_{harq}$ denotes an offset of a Hybrid Automatic Repeat Request (HARD),
$N_{pilot,C}$ denotes the number of pilot bits per slot on a DPCCH in the compressed mode,
$N_{pilot,N}$ denotes the number of pilot bits per slot on the DPCCH in the non-compressed mode, and
$N_{slots,1}$ denotes the number of non Discontinuous Transmission (DTX) slots in a frame used for the initial transmission of data.

2. The apparatus according to claim 1, wherein the instructions, when executed by the processor, further cause the processor to determine a transmit power of a E-DPDCH according to the determined E-DPDCH gain factor in the compressed mode.

3. The apparatus according to claim 2, wherein the instructions when executed by the processor, further cause the processor to determine a power offset according to a ratio of the E-DPDCH gain factor in the compressed mode to the DPCCH gain factor in the compressed mode, and
wherein the transmit power of the E-DPDCH is determined according to the determined power offset and an absolute power of a DPCCH.

* * * * *

UNITED STATES PATENT AND TRADEMARK OFFICE
CERTIFICATE OF CORRECTION

PATENT NO. : 9,155,050 B2  
APPLICATION NO. : 14/025504  
DATED : October 6, 2015  
INVENTOR(S) : Wang et al.

Page 1 of 1

It is certified that error appears in the above-identified patent and that said Letters Patent is hereby corrected as shown below:

In the claims

Column 8, Line 15, "(HARD)" should read -- (HARQ) --.

Column 8, Line 20, "$N_{slots,1}$" should read -- $N_{slots,I}$ --.

Signed and Sealed this  
Seventh Day of June, 2016

Michelle K. Lee  
*Director of the United States Patent and Trademark Office*